United States Patent
Krishnaswamy et al.

(10) Patent No.: US 9,672,351 B2
(45) Date of Patent: Jun. 6, 2017

(54) AUTHENTICATED CONTROL STACKS

(71) Applicant: QUALCOMM Incorporated, San Diego, CA (US)

(72) Inventors: Arvind Krishnaswamy, San Jose, CA (US); Can Acar, San Diego, CA (US); Robert Turner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 14/612,067

(22) Filed: Feb. 2, 2015

(65) Prior Publication Data

US 2016/0224784 A1   Aug. 4, 2016

(51) Int. Cl.
| | |
|---|---|
| *G06F 11/00* | (2006.01) |
| *H04L 9/32* | (2006.01) |
| *G06F 21/52* | (2013.01) |
| *G06F 21/44* | (2013.01) |
| *G06F 21/51* | (2013.01) |
| *G06F 12/0875* | (2016.01) |
| *G06F 15/78* | (2006.01) |
| *G06F 11/10* | (2006.01) |

(52) U.S. Cl.
CPC ............. *G06F 21/52* (2013.01); *G06F 11/10* (2013.01); *G06F 12/0875* (2013.01); *G06F 15/7846* (2013.01); *G06F 21/44* (2013.01); *G06F 21/51* (2013.01); *G06F 2212/451* (2013.01)

(58) Field of Classification Search
CPC .......... G06F 21/44; G06F 21/45; G06F 21/50; G06F 21/51; G06F 21/52; G06F 21/53; G06F 21/54; G06F 21/60

USPC ..... 726/16, 21–23, 25–27, 30; 713/189, 190
See application file for complete search history.

(56) References Cited

U.S. PATENT DOCUMENTS

| | | | |
|---|---|---|---|
| 5,107,457 A | 4/1992 | Hayes et al. | |
| 5,953,741 A | 9/1999 | Evoy et al. | |
| 6,389,540 B1 * | 5/2002 | Scheifler | G06F 9/4411 709/225 |
| 7,594,111 B2 * | 9/2009 | Kiriansky | G06F 21/554 713/166 |
| 7,603,704 B2 * | 10/2009 | Bruening | G06F 21/52 726/22 |
| 8,117,660 B2 * | 2/2012 | Pan | G06F 21/54 717/131 |

(Continued)

FOREIGN PATENT DOCUMENTS

GB   2343031 A   4/2000

OTHER PUBLICATIONS

International Search Report and Written Opinion—PCT/US2016/015438—ISA/EPO—Aug. 15, 2016—19 pgs.

(Continued)

*Primary Examiner* — Hosuk Song
(74) *Attorney, Agent, or Firm* — Won Tae C. Kim

(57) ABSTRACT

A method of producing a control stack includes: writing a plurality of control information entries into a control stack buffer that is internal to a processor in response to one or more function calls; and in response to the control stack buffer being full and receiving a further function call, writing: the plurality of control information entries to an external memory that is external to the processor; and a further control information entry, corresponding to the further function call, to the control stack buffer.

25 Claims, 6 Drawing Sheets

(56) References Cited

U.S. PATENT DOCUMENTS

| | | | |
|---|---|---|---|
| 8,196,110 B2* | 6/2012 | Cabrera Escandell | G06F 21/54 713/166 |
| 8,407,763 B2 | 3/2013 | Weller et al. | |
| 8,837,741 B2 | 9/2014 | Hawkes et al. | |
| 2006/0161773 A1 | 7/2006 | Okazaki et al. | |
| 2007/0226795 A1* | 9/2007 | Conti | G06F 21/74 726/22 |
| 2007/0277021 A1 | 11/2007 | O'Connor et al. | |
| 2009/0282393 A1 | 11/2009 | Costa et al. | |
| 2014/0020092 A1 | 1/2014 | Davidov | |
| 2014/0282873 A1 | 9/2014 | Struik | |

OTHER PUBLICATIONS

Partial International Search Report—PCT/US2016/015438—ISA/EPO—Apr. 15, 2016—9 pgs.

Lee, R. B., Kwan, P. C., McGregor, J. P., Dwoskin, J., & Wang, Z. (Jun. 4, 2005). Architecture for protecting critical secrets in microprocessors. Proceedings of the 32nd International Symposium on Computer Architecture (ISCA'05), pp. 2-13. IEEE XP010807890 DOI: 10.1109/ISCA.2005.14 ISBN:978-0/7695-2270-8.

Lee, R. B., Karig, D. K., McGregor, J. P., & Shi, Z. (Jan. 27, 2004). Enlisting hardware architecture to thwart malicious code injection. Security in Pervasive Computing [Lecture Notes in Computer Science; LNCS], pp. 237-252. Springer Berlin Heidelberg. XP019002202 ISBN: 978-3-540-20887-7.

Chiueh, T. C., & Hsu, F. H. (Apr. 16, 2001). RAD: A compile-time solution to buffer overflow attacks. Proceedings of the 21st International Conference on Distributed Computing Systems. pp. 409-417. IEEE. XP002292775 ISSN: 1063-6927 ISBN: 978-1-4577-0295-2.

* cited by examiner

AUTHENTICATED CONTROL STACKS

BACKGROUND

Computer software may be vulnerable to attacks that alter the operation of the software. For example, an exploit (so named because it exploits a vulnerability in software) such as a software worm or virus may alter existing software code, insert new code, and/or alter the order of execution of existing code from the originally intended order to induce operations that were not part of the original code as intended. Without any regulation as to acceptable entry points in software, an exploit may direct execution to any point in the software, facilitating unintended sequences of software execution because the entire software code is available for use by the exploit.

Processor architectures typically include a stack that is used for both data and control flow. The stack contains stack frames that track an activation record for every call in a call path through a program. The activation record usually contains data used by each function (local variables, parameters, etc.) along with control information (return addresses, stack pointer, etc.) that are used to reference data and/or maintain program control flow during calls and returns. Specifically, the return address is pushed onto the stack during a function call, and the called function allocates a stack frame containing its local variables on the stack including any local data buffers. Implementation bugs and unverified input may cause a program to overflow the buffers on the stack and overwrite the control data (e.g., return addresses, frame pointers). This, in turn, allows hijacking the control flow of the program by manipulating external input.

To protect against such stack-smashing attacks several mitigations have been proposed. One technique is Software Stack Protection (SSP), in which a guard value (or stack canary) is inserted on the stack next to the return address by a compiler, and the guard value is verified before the function returns. This method employs changes across the build cycle for each program that is protected in this fashion. Existing software is built with a compiler that supports Stack Canaries. To make canary values random for each run, access is provided to a random number generator. Error recovery handlers are provided to allow for recovery from stack smashing attacks. In addition to the complexity involved for each program, this technique also has size and performance overhead since each function that is protected is instrumented with code to generate canaries and perform the check. Another technique is A Stack Ghost, that instruments OS kernel trap handlers that are invoked on register window overflow situations to protect application return addresses as they are written to memory, checking for any malicious overwrites. This technique does not need application level enabling or code size costs, but relies on support register windows in the architecture. Another technique includes storing a shadow stack architecture in a separate, protected area of memory. The shadow stack is maintained either by duplicating the control information. The separate memory is allocated and managed for all threads of execution, introducing complexity.

SUMMARY

An example method of producing a control stack includes: writing a plurality of control information entries into a control stack buffer that is internal to a processor in response to one or more function calls; and in response to the control stack buffer being full and receiving a further function call, writing: the plurality of control information entries to an external memory that is external to the processor; and a further control information entry, corresponding to the further function call, to the control stack buffer.

Implementations of such a method may include one or more of the following features. The method further includes determining an authentication tag using at least a first control information entry and a second control information entry of the plurality of control information entries. The method further includes storing a respective portion of the authentication tag to the external memory in association with each of the first control information entry and the second control information entry. The plurality of control information entries includes more than two control information entries and wherein determining the authentication tag comprises applying a function to all of the plurality of control information entries. The method further includes: determining an authentication verifier using at least the first control information entry and the second control information entry stored in the external memory; determining that the authentication verifier matches the authentication tag; and writing the first control information entry from the external memory to the control stack buffer based upon the authentication verifier matching the authentication tag.

Also or alternatively, implementations of such a method may include one or more of the following features. Writing the plurality of control information entries to the external memory includes writing the plurality of control information entries to the external memory with the plurality of control information entries disposed in a first area of the external memory that is physically displaced from a second area of the external memory that stores program data corresponding to the control information entries. Writing the plurality of control information entries to the external memory includes writing the plurality of control information entries to the external memory with at least primary portions of the plurality of control information entries being duplicates of primary portions of stack frame control information entries written in stack frames, and wherein the stack frames are stored in the external memory and, at least when originally written, contain program data corresponding to the stack frame control information entries. The method further includes: determining that at least the primary portions of the plurality of control information entries match at least the primary portions of the stack frame control information entries; and writing the plurality of control information entries from the external memory to the control stack buffer based upon at least the primary portions of the plurality of control information entries matching at least the primary portions of the stack frame control information entries.

An example computing system includes: a processor containing a control stack buffer; and an external memory that is external to, and communicatively coupled to, the processor; where the processor is configured to: respond to a function call by writing a control information entry into the control stack buffer; respond to a control frame filling the control stack buffer, the control frame comprising a plurality of control information entries, and receiving a further function call by writing the control frame to the external memory and by writing a further control information entry, corresponding to the further function call, to the control stack buffer.

Implementations of such a computing system may include one or more of the following features. The processor is further configured to determine an authentication tag using at least a first control information entry and a second control information entry of the plurality of control information entries. The processor is further configured to store a respective portion of the authentication tag to the external memory in association with each of the first control information entry and the second control information entry. The plurality of control information entries includes more than two control information entries and wherein the processor is configured to determine the authentication tag by applying a function to all of the plurality of control information entries. The processor is further configured to: determine an authentication verifier using at least the first control information entry and the second control information entry stored in the external memory; determine that the authentication verifier matches the authentication tag; and write the first control information entry from the external memory to the control stack buffer based upon the authentication verifier matching the authentication tag.

Also or alternatively, implementations of such a computing system may include one or more of the following features. The processor is configured to write the control frame to the external memory by forming a split stack, with the plurality of control information entries disposed in a first area of the external memory that is physically separate from a second area of the external memory that stores program data corresponding to the control information entries. The processor is configured to write the control frame to the external memory by forming a shadow stack, with at least primary portions of the plurality of control information entries being duplicates of primary portions of stack frame control information entries written in stack frames, and wherein the stack frames are stored in the external memory and, at least when originally written, contain program data corresponding to the stack frame control information entries.

Another example computing system includes: means for storing a control stack buffer; means for storing program data and control data; means for responding to a function call by writing a control information entry into the control stack buffer; and means for responding to a control frame filling the control stack buffer, the control frame comprising a plurality of control information entries, and receiving a further function call by writing the control frame to the means for storing program data and control data and by writing a further control information entry, corresponding to the further function call, to the control stack buffer.

Implementations of such a computing system may include one or more of the following features. The system further includes means for authenticating configured to determine an authentication tag using at least a first control information entry and a second control information entry of the plurality of control information entries. The means for storing program data and control data are further for storing a respective portion of the authentication tag in association with each of the first control information entry and the second control information entry. The plurality of control information entries comprises more than two control information entries and wherein the means for authenticating are configured to determine the authentication tag by applying a function to all of the plurality of control information entries. The means for authenticating are further configured to: determine an authentication verifier using at least the first control information entry and the second control information entry stored in the means for storing program data and control data; and determine that the authentication verifier matches the authentication tag; where the system further comprises means for writing the first control information entry from the storage means to the control stack buffer based upon the authentication verifier matching the authentication tag.

Also or alternatively, implementations of such a computing system may include one or more of the following features. The means for storing program data and control data are further for writing the control frame by forming a split stack, with the plurality of control information entries disposed in a first area of the means for storing program data and control data that is physically separate from a second area of the means for storing program data and control data that stores program data corresponding to the control information entries. The means for storing program data and control data are further for writing the control frame by forming a shadow stack, with at least primary portions of the plurality of control information entries being duplicates of primary portions of stack frame control information entries written in stack frames, and wherein the stack frames are stored in the means for storing program data and control data and, at least when originally written, contain program data corresponding to the stack frame control information entries.

An example non-transitory processor-readable storage device includes processor-readable instructions configured to cause a processor to: respond to a function call by writing a control information entry into a control stack buffer in the processor; respond to a control frame filling the control stack buffer, the control frame comprising a plurality of control information entries, and receiving a further function call by writing the control frame to an external memory, communicatively couple to the processor and physically separate from the processor, and by writing a further control information entry, corresponding to the further function call, to the control stack buffer.

Implementations of such a storage device may include one or more of the following features. The instructions are further configured to cause the processor to determine an authentication tag using at least a first control information entry and a second control information entry of the plurality of control information entries. The instructions are further configured to cause the processor to store a respective portion of the authentication tag to the external memory in association with each of the first control information entry and the second control information entry. The plurality of control information entries includes more than two control information entries and wherein the instructions configured to cause the processor to determine the authentication tag are configured to cause the processor to determine the authentication tag by applying a function to all of the plurality of control information entries. The instructions are further configured to cause the processor to: determine an authentication verifier using at least the first control information entry and the second control information entry stored in the external memory; determine that the authentication verifier matches the authentication tag; and write the first control information entry from the external memory to the control stack buffer based upon the authentication verifier matching the authentication tag.

Also or alternatively, implementations of such a storage device may include one or more of the following features. The instructions configured to cause the processor to write the control frame to the external memory are configured to cause the processor to write the control frame to the external memory by forming a split stack, with the plurality of control information entries disposed in a first area of the external memory that is physically separate from a second area of the external memory that stores program data corresponding to the control information entries. The instructions configured to cause the processor to write the control frame to the external memory are configured to cause the processor to write the control frame to the external memory by forming a shadow stack, with at least primary portions of the plurality of control information entries being duplicates of primary portions of stack frame control information entries written in stack frames, and wherein the stack frames are stored in the external memory and, at least when originally written, contain program data corresponding to the stack frame control information entries.

Items and/or techniques described herein may provide one or more of the following capabilities, and/or other capabilities not mentioned. Return paths for control transfers may be efficiently verified before being executed. Stack-smashing exploit attacks may be inhibited, e.g., by separating control data and program data. A shadow or split control/data stack architecture may be provided at the hardware level using authentication for stack spills (overflows) and stack fills (populating stacks with data). A shadow or split control/data stack architecture may be provided with simple management at low complexity. Control flow integrity may be maintained in a scalable and transparent manner, e.g., by increasing a block size used for control data authentication, reducing authentication frequency, and/or performing return path control data authentication off the critical path. Computational overhead for determining message authentication codes for control data may be reduced. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Techniques are discussed for producing a control stack. For example, a processor may have an internal control stack buffer that stores the most-recent return addresses corresponding to the most-recent function calls of a software program. The control stack buffer may be used for all function returns. If the control stack buffer is full and another function is called (overflow), or if there is a context switch, then the control stack buffer contents may be written to an external (relative to the processor) memory, and the return address for the another function, or the other context, written to the control stack buffer. The control stack buffer contents may be page written to the external memory, with all of the contents of the control stack buffer written to the external memory, emptying the control stack buffer. The control stack buffer contents may be written to a program stack in a split stack arrangement without the same data being stored in stack frames in the program stack, or in a shadow stack arrangement with the same data being stored in stack frames in the program stack. An authentication tag may be determined based on the control stack buffer and the authentication tag may be stored in association with the control stack buffer contents in the external memory. Control data may be written from the external memory to the control stack buffer if the control stack buffer is emptied by having all the return addresses in the control stack buffer being used (underflow), or if there is a context switch. If an authentication tag is used, then the authentication tag may be re-determined and compared with the authentication tag stored in external memory before writing return addresses stored in the external memory to the control stack buffer. If the stored and re-determined authentication tags match, then the return addresses from external memory may be written to the control stack buffer, and otherwise not written to the control stack buffer. If a shadow stack is used, then the return addresses in the shadow stack may be compared with the return addresses in the program stack and the return addresses, e.g., in the shadow stack, only written to the control stack buffer if the two sets of return addresses match. Other techniques may be used including, but not limited to, techniques discussed below.

Figure 1:
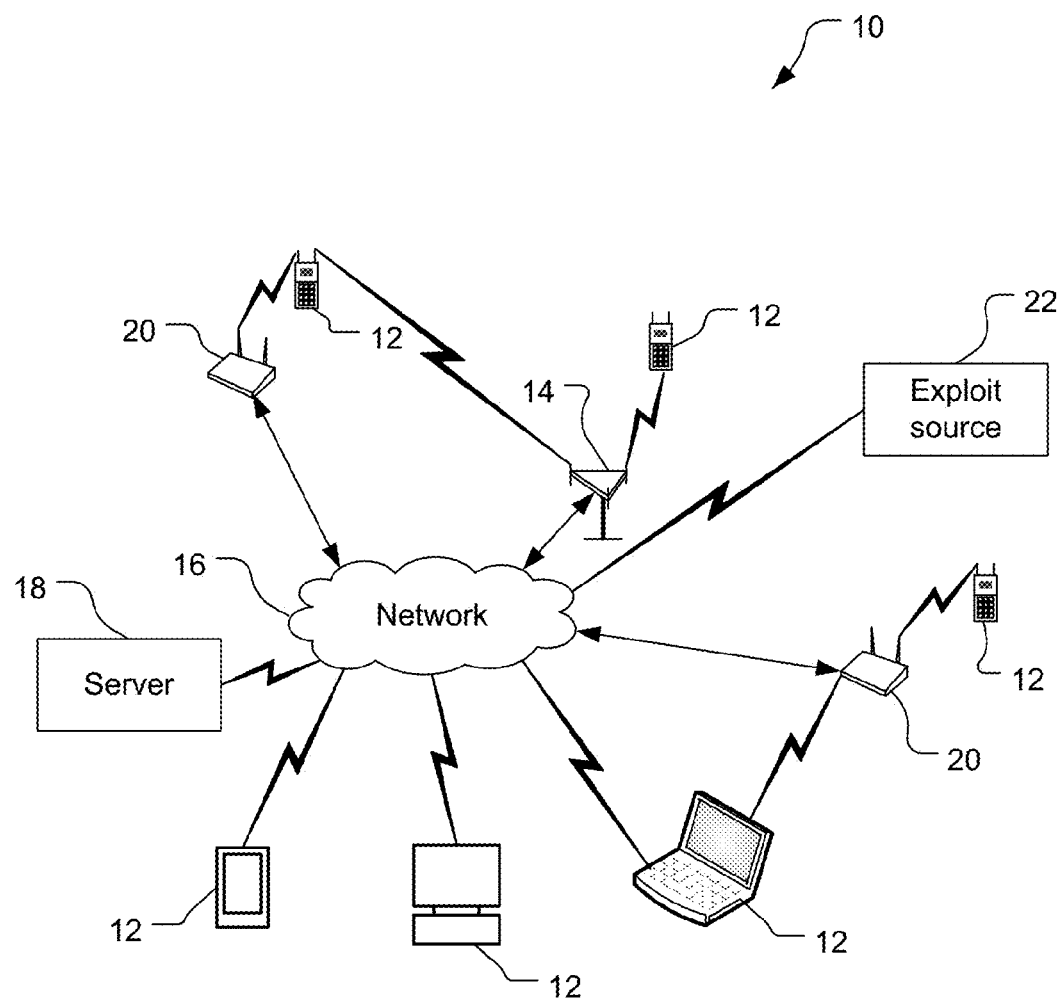
FIG. 1 is a schematic diagram of a communication system.

Referring to FIG. 1, a communication system 10 includes computing devices 12, a base transceiver station (BTS) 14, a network 16, a server 18, access points (APs) 20, and an exploit source 22. The system 10 is a communication system in that components of the system 10 can communicate with one another directly or indirectly, e.g., via the network 16, the BTS 14 (and/or one or more BTSs not shown), and/or one or more of the access points 20. While exploits are typically introduced into a computing device via a communication network (such as the network 16 shown in FIG. 1) and a network interface in the computing device 12, the techniques discussed herein are equally applicable to helping prevent the success of an attack where an exploit is introduced to a computing device via other means, e.g., connection to an external memory containing the exploit. The example computing devices 12 shown include mobile phones, a desktop computer, a laptop computer, and a tablet computer. Still other computing devices may be used, whether currently existing or developed in the future.

Figure 2:
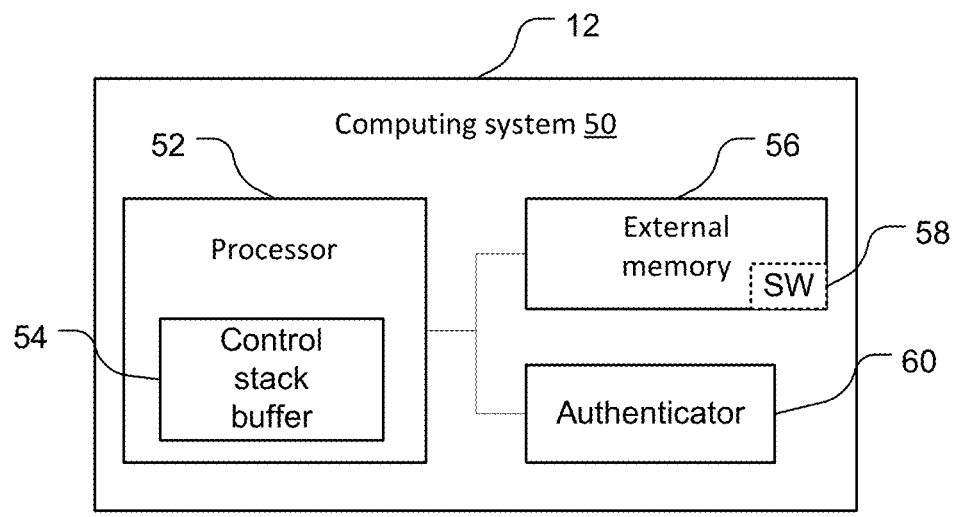
FIG. 2 is block diagram of a computing system shown in FIG. 1

Referring to FIG. 2, an example of one of the computing devices 12 comprises a computing system 50 that includes a processor 52 including a control stack buffer 54, an external memory 56 including (optionally) software 58, and an authenticator 60. The processor 52 is preferably an intelligent hardware device, e.g., a central processing unit (CPU) such as those made or designed by ARM®, Intel® Corporation, or AMD®, a microcontroller, an application specific integrated circuit (ASIC), etc. The processor 52 could comprise multiple separate physical entities that can be distributed in the computing device 12. The control stack buffer 54 is internal to the processor 52 and trusted not to be susceptible to overflow attacks/exploits. The control stack buffer 54 stores the return addresses of the most-recent function calls. The external memory 56 is external to the processor 52 and may include random access memory (RAM) and/or read-only memory (ROM). The memory 54 is a processor-readable storage medium that may store the software 58 which is processor-readable, processor-executable software code containing instructions that are configured to, when executed, cause the processor 52 to perform various functions described herein (although the description may refer only to the processor 52 performing the functions). Alternatively, the software 58 may not be directly executable by the processor 52 and instead may be configured to cause the processor 52, e.g., when compiled and executed, to perform the functions. The processor 52 is communicatively coupled to the external memory 56 and the authenticator 60. The authenticator 60 may be implemented in hardware, firmware, by the processor 52, or by the processor 52 and the software 58, or by a combination of any of these. Further, in addition to the computing devices 12 as shown in FIG. 1, the techniques discussed herein may be applied to any device containing memory with processor-readable instructions that have one or more vulnerabilities to one or more exploits. Thus, for example, the server 18, the BTS 14, the access points 20, and components (e.g., routers, gateways, etc.) of the network 16 shown in FIG. 1 may include the components shown in FIG. 2 (and modules/means shown in FIG. 3), as well as any other device containing memory with processor-readable instructions that have one or more vulnerabilities to one or more exploits.

Figure 3:
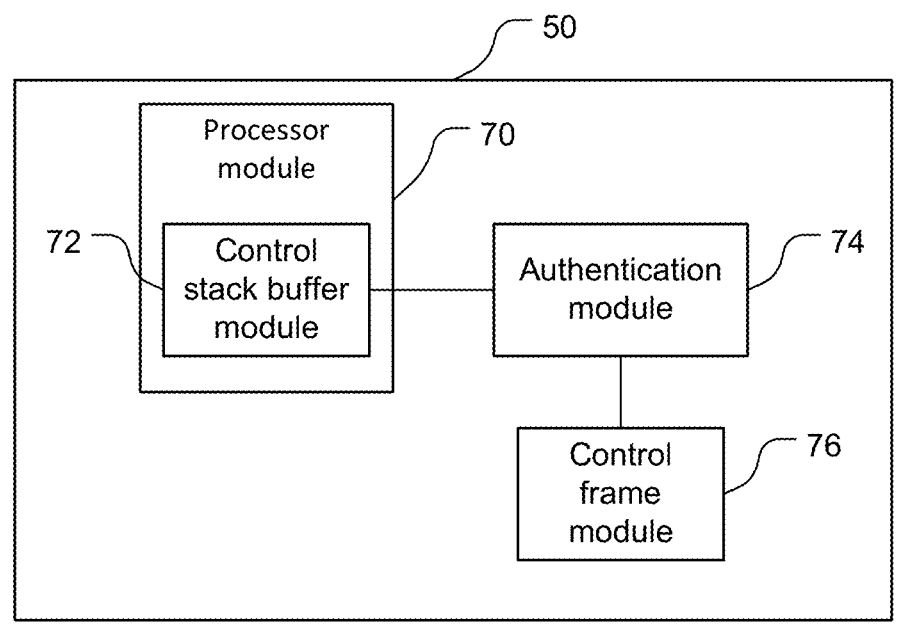
FIG. 3 is a functional block diagram of the computing system shown in FIG. 2.

Referring to FIG. 3, with reference to FIG. 2, the computing system 50 includes a processor module 70 (means for processing) that includes a control stack buffer module 72 (means for storing a control stack buffer), an authentication module 74 (means for authenticating), and a control frame module 76 (means for storing program data and control data). The processor module 70 includes means for writing control data to the control stack buffer and means for writing a control frame to the means for storing program data and control data. The modules 70, 72 are functional modules that may be implemented by the processor 52 and the control stack buffer 54, respectively. The authentication module 74 is a functional module that may be implemented by the authenticator 60. The control frame module 76 is a functional module that may be implemented by the external memory 56 and associated hardware, and/or firmware, and/or the processor 52 and the software 58 stored in the memory 56. Thus, reference to any of the modules 70, 72, 74, 76 performing or being configured to perform a function is shorthand for the corresponding apparatus performing or being configured to perform the function.

Figure 4:
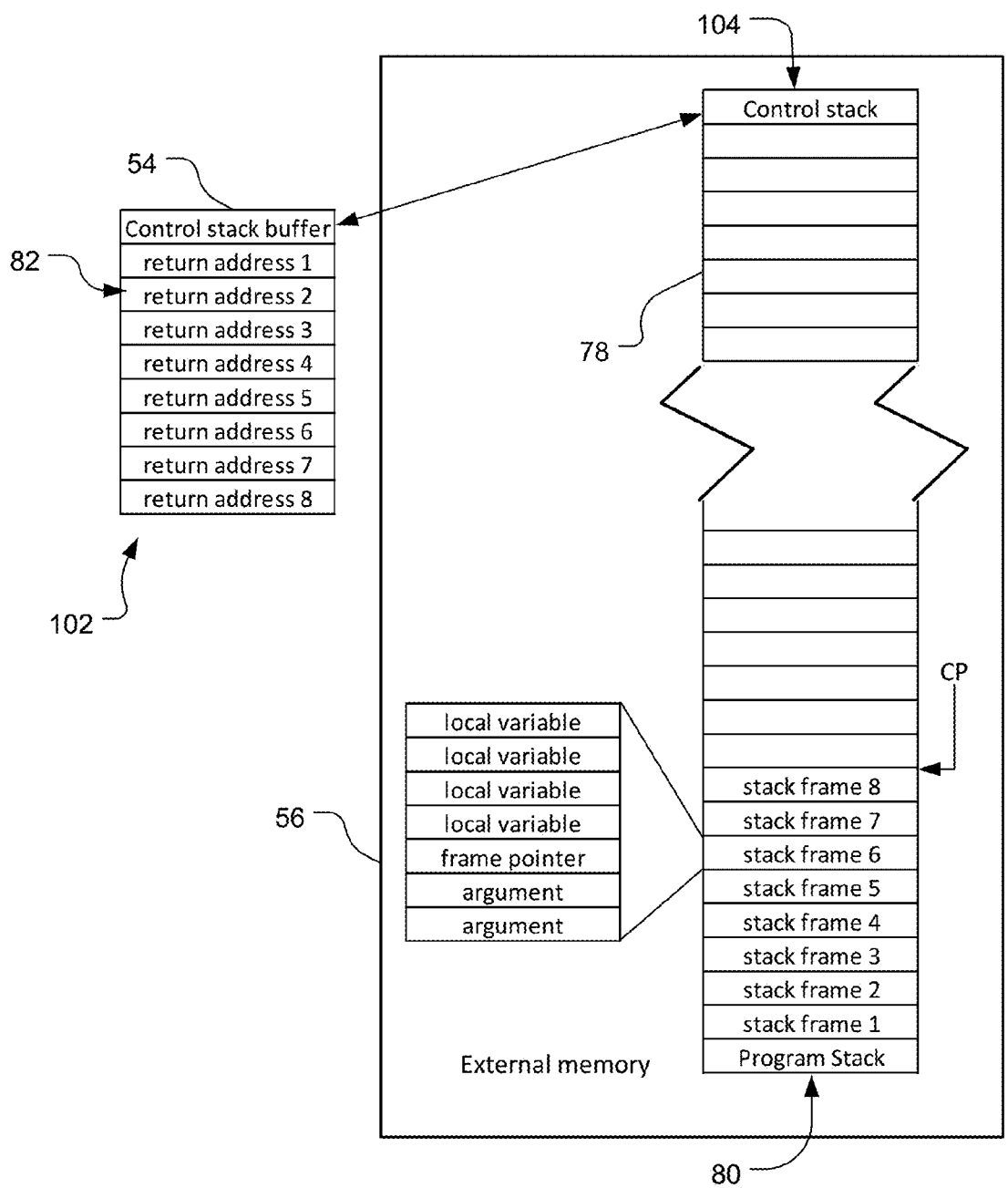
FIGS. 4-5 are simplified diagrams of a control stack buffer and a split program stack.
Figure 5:
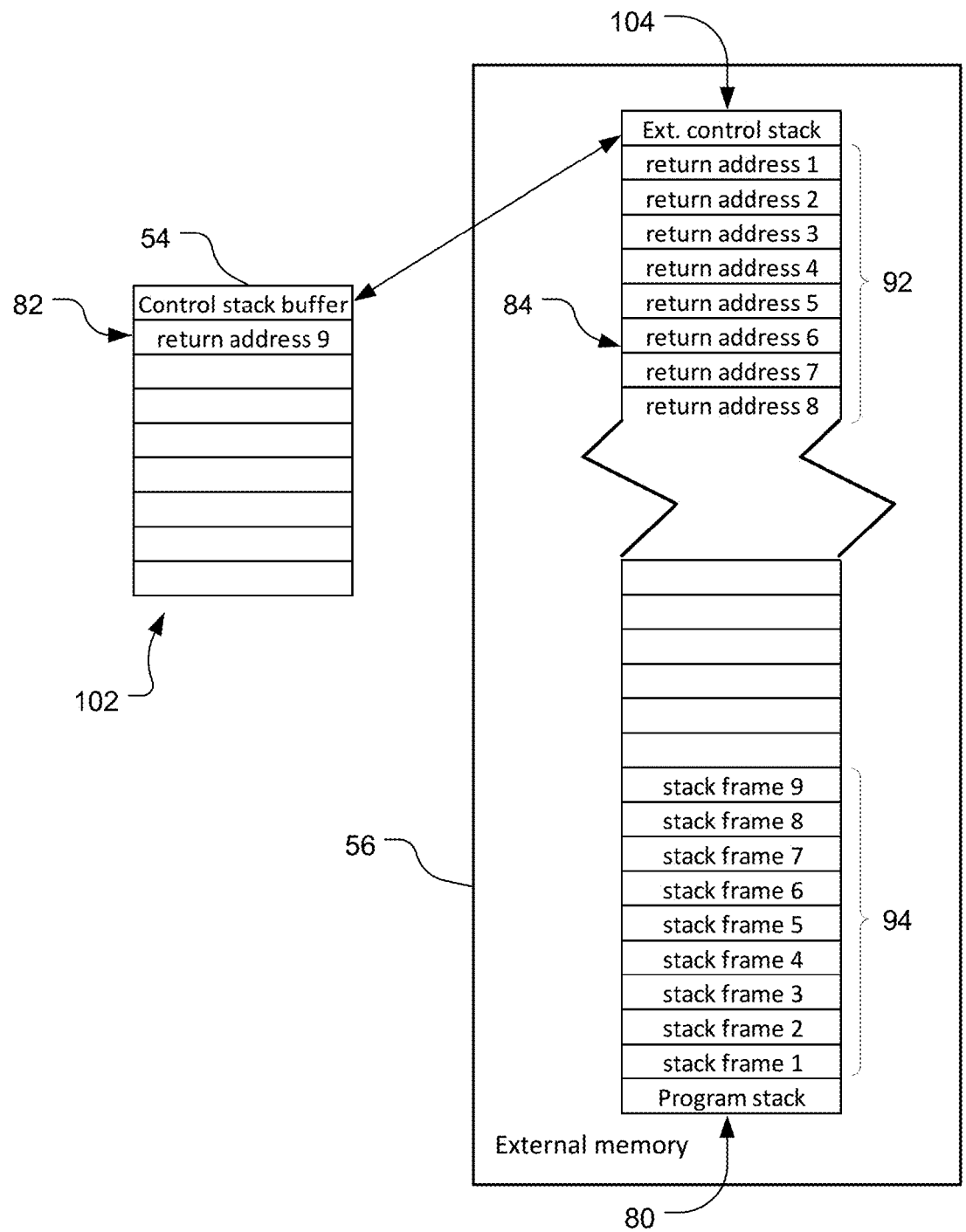

Referring also to FIGS. 4-5, a control stack 102, 104 and a program stack 80 are formed. The control stack 102, 104 contains control data for a program run by the processor 52 and is partitioned into two parts, an internal control stack 102 in the control stack buffer 54 and an external control stack 104, in a stack memory 78, in the external memory 56. The control data include return addresses and/or frame pointers and/or other control information. The program stack 80 includes program data that include local variables, arguments, etc., and may also include some control data, e.g., frame pointers. An operating system of the computing system 50 points a control pointer (CP), a separate architectural register, to a present program location in the program data, here to a top of the program data in the program stack 80 in the example shown in FIG. 4.

The control stack buffer module 72 is configured to receive control data from the processor 52, store control data in the control stack buffer (CSB) 54, send control data blocks from the CSB 54 to the external memory 56, and receive blocks of control data from the external memory 56. The CSB 54 and the external control stack 104 are empty at start-up and the program stack 80 is empty as well. As function calls are executed in a software program by the processor 52, the processor 52 provides control data to the control stack buffer module 72. The control stack buffer module 72 is configured to receive the control data and write these control data to the control stack buffer 54. For example, as shown in FIG. 4, the control stack buffer module 72 may write return addresses into the CSB 54 as control data entries 82. In this example, the control data are return addresses, but this is an example only and other control data, such as frame pointers, etc., may be stored instead of, or in addition to, return addresses in the CSB 54. The module 72 is configured to respond to the processor 52 having a new control data entry to be stored in the CSB 54 when the CSB 54 is full, or to respond to a context switch (i.e., a change in the program or portion of the program being run by the processor 52), by removing control data from the CSB 54 and writing the new control data entry into the CSB 54. The CSB 54 is "full" if the contents of the CSB 54 are to be sent to the control frame module 76 even if additional storage space is available in the CSB 54. Typically, however, the entire storage space of the CSB 54 will be used before sending the contents to the control frame module 76. The module 72 page writes multiple ones of the control data entries 82, and preferably all of the control data entries 82, to the control frame module 76. Thus, the module 72 may empty the CSB 54 by sending the contents of the CSB 54 to the control frame module 76. As shown in FIG. 5, the module 72 has emptied the CSB 54 by sending return address 1—return address 8 to the control frame module 76 and writing return address 9 to the CSB 54. Conversely, when the module 72 empties the CSB 54 by using the control data in the CSB 54, the module 72 can retrieve a block of control data from the control frame module 76. Thus, if the return address 9 in FIG. 5 is used by the processor module 70, then the module 72 can request the next block of return addresses and receive return address 1—return address 8 from the control frame module 76, going from FIG. 5 to FIG. 4. In the example shown in FIGS. 4-5, the CSB has a capacity of eight control data entries 82, although other capacities of the CSB 54 may be used.

The control stack buffer module 72 preferably, though not necessarily, sends a block of the control data entries 82 to the control frame module 76 via the authentication module 74. The authentication module 74 is configured to derive security information from one or more of the control data entries 82 in such a manner that the security information is highly unlikely to be re-created by chance or even if the control data entries 82, upon which the security information is derived, are known. The security information is highly unlikely to be recreated in that the security information will be computationally costly to recreate or reproduce, making the resources (time, computational energy, etc.) needed to recreate the information too great to justify, even if possible to do so. To produce the security information, the authentication module 74 may, for example, apply a function to one or more of the control data entries 82, and preferably all of the control data entries 82, to determine the security information. An example of such a function is a hash function. The authentication module 74 is configured such that access to the authentication module 74, and in particular the function applied by the authentication module 74 including any hash value(s) hashed with the control data entries 82, is difficult if not impossible by an entity attempting to produce an exploit in the computing system 50.

As an example, the authentication module 74 is configured to produce an authentication tag based on multiple ones of the control data entries 82 from the CSB 54. Preferably, the authentication module 74 uses all of the control data entries 82 that are emptied from the CSB 54 in order to determine the authentication tag. The authentication tag is a cryptographically secure message authentication code (MAC). The authentication module 74 can determine the authentication tag using any of a variety of techniques. For example, the authentication module 74 may apply a hash function to the control data entries 82, using a hashed value to determine the authentication tag. The authentication tag may have any of a variety of lengths (which may be based on other factors such as CSB size), and may be stored in a variety of locations in the external memory 56. For example, a size of the CSB 54 may be a multiple of a cache line, and the authentication tag size may be set to two bits times the quantity of control data entries 82 in the CSB 54. Thus, for a CSB size of eight (8) entries 82, each four bytes long, and with a 32-byte cache line, there would be 16 bits for the authentication tag, two bits per entry. The size of the CSB 54 may be increased to accommodate larger authentication tags.

Figure 6:
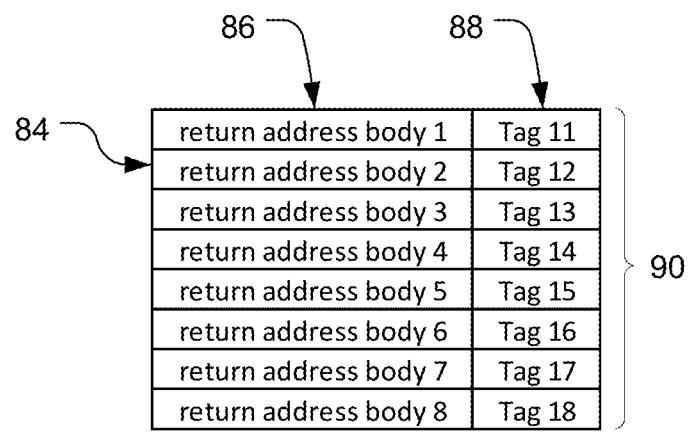
FIG. 6 is a simplified diagram of control data entries including an authentication tag.

The authentication module 74 is configured to provide the authentication tag with the control data entries 82 to the control frame module 76. For example, the authentication module 74 may combine the authentication tag into the control data entries 82 before providing the control data entries 82 to the control frame module 76. Thus, the authentication module 74 may produce modified control data entries 84 as shown in FIG. 6, with each of the modified control data entries 84 including a control data body 86 and an authentication tag portion 88. Alternatively, the authentication module 74 may provide the control data bodies 86 (here, return address bodies) and the corresponding authentication tag portions 88 to the control frame module 76 separately.

The control frame module 76 is configured to receive the control data bodies 86 and the authentication tag portions 88, and to store the modified control data entries 84 in the external control stack 104. The module 76 may receive the control data bodies 86 and the authentication tag portions 88 separately and combine them to form the modified control data entries 84. Alternatively, the module 76 may receive the modified control data entries 84, with the control data bodies 86 and the authentication tag portions 88 already combined. In either case, the module 76 is configured to store the modified control data entries 84 in the external control stack 104, that is to store the control data bodies 86 in association with the authentication tag portions 88 such that the authentication tag portions 88 may be retrieved if the control data bodies 86 are sought to be returned to the internal control stack 102. The modified control data entries 84 are written to the external control stack 104 as shown in FIG. 5. As shown in FIG. 6, in this example, the authentication tag portions 88 are appended to the control data bodies 86, for example occupying the two least-significant bits of the modified control data entries 84. Further in this example, for illustrative purposes the authentication tag portions 88 are labeled in FIG. 6 with a two-digit identifier. The first digit of the identifier corresponds to the authentication tag number and the second digit of the identifier corresponds to the return address. Thus, tag 11 corresponds to the portion of authentication tag 1 for the return address 1. The combination of all the authentication tag portions 88 constitute an authentication tag 90.

As shown in FIG. 5, the control frame module 76 is configured to store control data 92 received from the control stack buffer module 72 in the external control stack 104 physically displaced from program data 94 stored in the program stack 80. The control frame module 76 is configured to store stack frames of the program data 94 in one or more physical locations, and to store the control data 92 in one or more other physical locations that are physically displaced from the location were locations storing the program data 94, at least initially. Ends of the control data 92 and the program data 94 may eventually be disposed in adjacent physical locations if the external control stack 104 and the program stack 80 reach each other, but the stacks 104, 80 are begun in displaced locations (i.e., separated by memory locations). Thus, it will be unlikely, if not impossible, for overflows in the program data to affect the control data 92. Consequently, overflows in the program data 94 are unlikely to alter, if not being prohibited from altering, the control data 94, thus reducing, if not eliminating, the possibility for stack-smashing exploits. The example shown in FIG. 5 is just that, an example, as numerous other memory storage configurations may be used. For example, the control frame module 76 may begin the program data 94 and the control data 92 at adjacent physical locations in the stack memory 78, and grow the control data 92 and the program data 94 in opposite directions, i.e., physically away from each other. Still other configurations are possible and may be used.

As shown in FIGS. 4-5, the control frame module 76 is configured to store the program data 94 in stack frames. In this example, each stack frame includes local variables, the frame pointer, and arguments, but not the return address. This configuration, with the control data that are stored in the CSB 54 (or stored as the control data 92) not being stored in the stack frames is referred to as a split-stack configuration. That is, the control data 92 are stored physically separate from the program data 94 and reside only in the control data 92 of the stack memory 78, and not in the program data 94 of the stack memory 78. Alternatively, the control data 92 may be included in the program data 94. This configuration, with the control data that are stored in the CSB 54 (or stored as the control data 92) also being stored in the stack frames is referred to as a shadow-stack configuration. For example, a return address may be stored in the control data 92, and also stored in a respective stack frame of the program data 94, e.g., between the frame pointer and the first argument.

The control frame module 76 is further configured to provide the modified control data entries 84 to the authentication module 74. The control frame module 76 is configured to respond to receiving a request from the authentication module 74 (e.g., in response to an underflow in the CSB 54 or a context switch) by providing a block of the modified control data entries 84 corresponding to the authentication tag 90. The control frame module 76 adjusts the control pointer accordingly, moving the control pointer to the next block of control data in response to providing the control data in response to an underflow of the CSB 54, or saving the control pointer for future reference in response to a context switch.

The authentication module 74 is further configured to determine whether control data in the external control stack 104 has been modified before providing the control data from the external control stack 104 to the control stack buffer module 72. The authentication module 74 is configured to verify control data integrity in response to a desire, e.g., a request, to write control data from the external control stack 104 to the internal control stack 102 in the CSB 54, e.g., in response to an underflow in the CSB 54 or a context switch. To verify control data integrity, the authentication module 74 may request the modified control data entries 84 for the authentication tag 90 from the control frame module 76, determine a re-computed authentication tag (also called an authentication verifier), and determine whether the re-computed authentication tag matches the authentication tag 90 stored in the external control stack 104. For control data to be written from the external control stack 104 into the internal control stack 102 in the CSB 54, the authentication module 74 re-computes the function that was applied to the control data to produce the authentication tag 90, this time computing the function using the control data bodies 86 to determine the re-computed authentication tag. To re-compute the function, the authentication module 74 is configured to receive the control data from the control frame module 76 and to apply the function to the received control data. The authentication module 74 is configured to apply the function used to determine the authentication tag 90 to the control data bodies 86 received from the control frame module 76 to determine the re-computed authentication tag. The authentication module 74 is further configured to compare the re-computed authentication tag to the authentication tag 90 received from the control frame module 76 to determine whether the re-computed authentication tag matches the authentication tag 90. The authentication module 74 is configured to respond to this comparison indicating that the re-computed authentication tag matches the authentication tag 90 by providing the control data entries 86 to the control stack buffer module 72. The authentication module 74 is configured to respond to this comparison indicating that the re-computed authentication tag does not match the authentication tag 90 by inhibiting the control data entries 86 from being sent to the control stack buffer module 72, and by providing a warning to the processor module 70 that control data integrity has been lost in that at least one of the control data bodies 86 has been modified.

Figure 7:
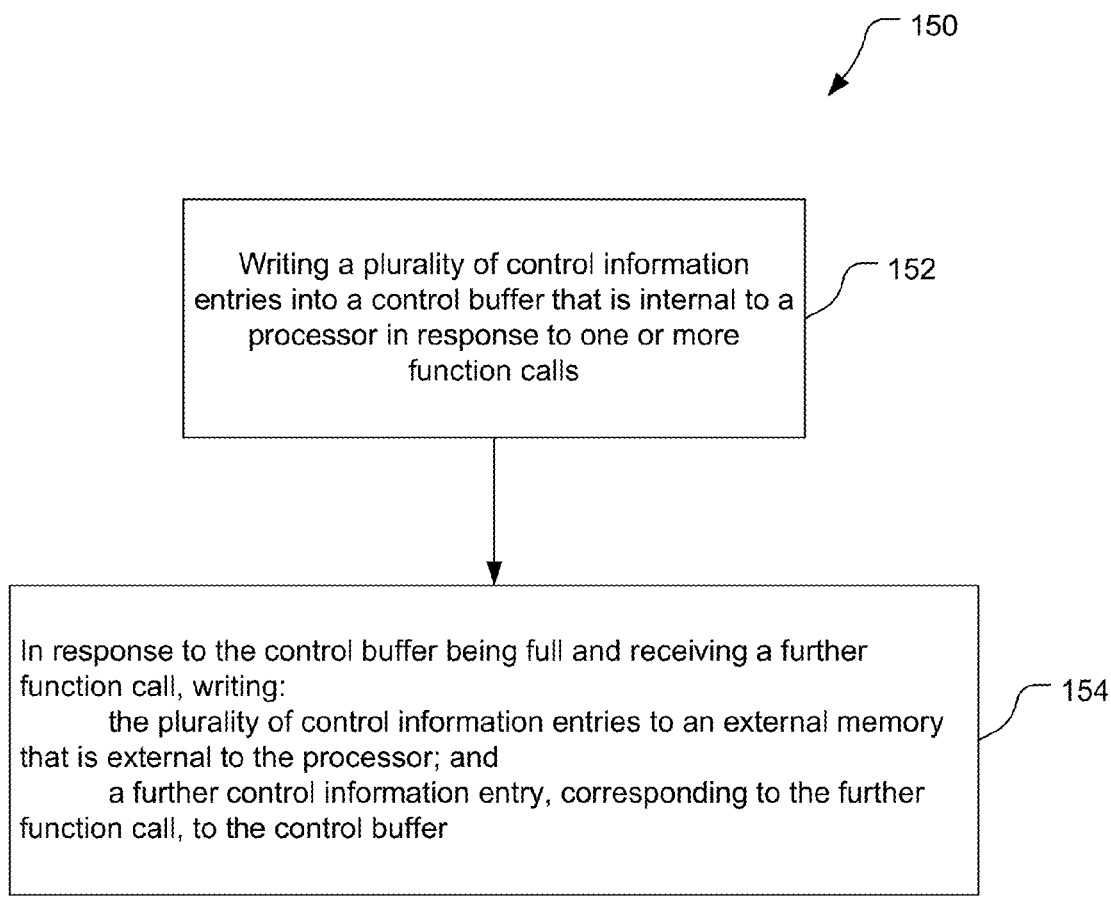
FIG. 7 is a block flow diagram of a process of producing a control stack.

Referring to FIG. 7, with further reference to FIGS. 1-6, a process 150 of producing a control stack includes the stages shown. The process 150 is, however, an example only and not limiting. The process 150 can be altered, e.g., by having stages added, removed, rearranged, combined, performed concurrently, and/or having single stages split into multiple stages.

At stage 152, the process 150 includes, writing a plurality of control information entries into a control buffer that is internal to a processor in response to one or more function calls. The control stack buffer module 72 responds to one or more function calls by writing the control data entries 82 into the CSB 54 inside the processor 52. The control data entries 82 are written until the CSB 54 is full. Before the CSB 54 fills, one or more of the control data entry 82 may be removed from the CSB 54 in response to a function completing or otherwise using the control data in the respective control data entry 82.

At stage 154, the process 150 includes, in response to the control buffer being full and receiving a further function call, writing: the plurality of control information entries to an external memory that is external to the processor; and a further control information entry, corresponding to the further function call, to the control buffer. The control stack buffer module 72 responds to the CSB 54 being full and a further control data entry 82 being received for storage in the CSB 54 by page writing the control data entries 82 to the external memory 56. For example, the control stack buffer module 72 page writes the block of control data entries 82 in the internal control stack 102 to the external memory 56, i.e., by sending the block of the control data entries 82 to the control frame module 76, preferably via the authentication module 74.

The process 150 may further include determining an authentication tag using at least a first control information entry and the second control information entry of the plurality of control information entries. For example, the authentication module 74 receives the block of the control data entries 82 from the control stack buffer module 72 and determines the authentication tag using at least two of the control data entries 82. The authentication module 74 may use all of the control data entries 82 received from the control stack buffer module 72 to determine the authentication tag 90. The process 150 may include storing a respective portion of the authentication tag to the external memory in association with each of the control information entries. The authentication module 74 in combination with the control frame module 76 may store the authentication tag portions 88 to the external memory 56 in association with the corresponding control data bodies 86. The process 150 may further include determining an authentication verifier using the first and second control information entries stored in the external memory, determining that the authentication verifier matches the authentication tag, and writing the first control information entry from the external memory to the control stack buffer based on the authentication verifier matching the authentication tag. For example, the authentication module 74 responds to an underflow condition new in the CSB 54 or two a context switch by retrieving the modified control data entries 84 from the control frame module 76. The authentication module 74 determines the authentication verifier by re-computing the authentication tag and compares the authentication verifier with the authentication tag, e.g., the authentication tag 90. Further, in response to the authentication verifier matching the authentication tag as determined by the authentication module 74, the authentication module 74 sends at least the control data bodies 86 to the control stack buffer module 72 that writes the control data bodies 86 to the internal control stack 102 in the CSB 54.

Writing the plurality of control information entries to the external memory may comprise writing the plurality of control information entries to the external memory with the plurality of control information entries disposed in a first area of the external memory that is physically displaced from a secondary of the external memory that stores program data corresponding to the control information entries. The control frame module 76 may store the external control stack 104 in a physically displaced location in the stack memory 78 from the program stack 80. Further, the plurality of control information entries may be written to the external memory with at least primary portions of the plurality of control information entries being duplicates of primary portions of stack frame control information entries written in stack frames, where the stack frames are stored in the external memory and, at least when originally written, contain program data corresponding to the stack frame control information entries. For example, the control frame module 76 may store stack frames in the program stack 80 that include control data that are stored as control data bodies 86 in the external control stack 104 as a shadow stack. Further, the process 150 may further include determining that at least the primary portions of the plurality of control information entries match at least the primary portions of the stack frame control information entries, and writing the plurality of control information entries from the external memory to the control stack buffer based upon at least the primary portions of the plurality of control information entries matching at least the primary portions of the stack frame control information entries. For example, the authentication module 74 may be configured to, and may, determine that the control data bodies 86 stored in the external control stack 104 match the corresponding control data in the corresponding stack frames of the program stack 80. The authentication module 74 may be configured to, and may, inhibit delivery of the control data bodies 86 to the control stack buffer module 72 if the control data bodies 86 in the external control stack 104 do not match the corresponding control data in the stack frames. Conversely, the authentication module 74 may be configured to, and may, send the control data bodies 86 to the control stack buffer module 72 if the control data bodies 86 in the external control stack 104 match the corresponding control data in the stack frames, and the control stack buffer module 72 may write the received control data bodies 86 to the CSB 54 as the internal control stack 102.

Other Considerations

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A alone, or B alone, or C alone, or AB, or AC, or BC, or ABC (i.e., A and B and C), or combinations with more than one of the same feature (e.g., AA, AAB, ABBC, etc.).

As another example implementation, instead of storing the external control stack 104 as a separate entity, the control frame module 76 may store the external control stack 104 in a distributed manner. In this case, the modified control data entries 84 would be stored in the program stack 80 with their respective stack frames. The control frame module 76 would be configured to find and deliver the external control stack 104 to the authentication module 74 and the authentication module 74 would be configured to determine the control data integrity as discussed above.

As used herein, including in the claims, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include that the information is conveyed from a sending entity but does not reach an intended recipient of the information. The intended recipient, even though not actually receiving the information, may still be referred to as a receiving entity, e.g., a receiving execution environment.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. A method of producing a control stack, the method comprising:
    writing a plurality of control information entries into a control stack buffer that is internal to a processor in response to one or more function calls;
    determining an authentication tag using at least a first control information entry and a second control information entry of the plurality of control information entries; and
    in response to the control stack buffer being full and receiving a further function call, writing:
        the plurality of control information entries to an external memory that is external to the processor; and
        a further control information entry, corresponding to the further function call, to the control stack buffer.

2. The method of claim 1, further comprising storing a respective portion of the authentication tag to the external memory in association with each of the first control information entry and the second control information entry.

3. The method of claim 1, wherein the plurality of control information entries comprises more than two control information entries and wherein determining the authentication tag comprises applying a function to all of the plurality of control information entries.

4. The method of claim 1, further comprising:
    determining an authentication verifier using at least the first control information entry and the second control information entry stored in the external memory;
    determining that the authentication verifier matches the authentication tag; and
    writing the first control information entry from the external memory to the control stack buffer based upon the authentication verifier matching the authentication tag.

5. The method of claim 1, wherein writing the plurality of control information entries to the external memory comprises writing the plurality of control information entries to the external memory with the plurality of control information entries disposed in a first area of the external memory that is physically displaced from a second area of the external memory that stores program data corresponding to the control information entries.

6. The method of claim 5, wherein writing the plurality of control information entries to the external memory comprises writing the plurality of control information entries to the external memory with at least primary portions of the plurality of control information entries being duplicates of primary portions of stack frame control information entries written in stack frames, and wherein the stack frames are stored in the external memory and, at least when originally written, contain program data corresponding to the stack frame control information entries.

7. The method of claim 6, further comprising:
    determining that at least the primary portions of the plurality of control information entries match at least the primary portions of the stack frame control information entries; and
    writing the plurality of control information entries from the external memory to the control stack buffer based upon at least the primary portions of the plurality of control information entries matching at least the primary portions of the stack frame control information entries.

8. A computing system comprising:
    a processor containing a control stack buffer; and
    an external memory that is external to, and communicatively coupled to, the processor;
    wherein the processor is configured to:
        respond to a function call by writing a control information entry into the control stack buffer;
        respond to a control frame filling the control stack buffer, the control frame comprising a plurality of control information entries, and receiving a further function call by writing the control frame to the external memory and by writing a further control information entry, corresponding to the further function call, to the control stack buffer; and
        determine an authentication tag using at least a first control information entry and a second control information entry of the plurality of control information entries.

9. The system of claim 8, wherein the processor is further configured to store a respective portion of the authentication tag to the external memory in association with each of the first control information entry and the second control information entry.

10. The system of claim 8, wherein the plurality of control information entries comprises more than two control information entries and wherein the processor is configured to determine the authentication tag by applying a function to all of the plurality of control information entries.

11. The system of claim 8, wherein the processor is further configured to:
    determine an authentication verifier using at least the first control information entry and the second control information entry stored in the external memory;
    determine that the authentication verifier matches the authentication tag; and
    write the first control information entry from the external memory to the control stack buffer based upon the authentication verifier matching the authentication tag.

12. The system of claim 8, wherein the processor is configured to write the control frame to the external memory by forming a split stack, with the plurality of control information entries disposed in a first area of the external memory that is physically separate from a second area of the external memory that stores program data corresponding to the control information entries.

13. The system of claim 8, wherein the processor is configured to write the control frame to the external memory by forming a shadow stack, with at least primary portions of the plurality of control information entries being duplicates of primary portions of stack frame control information entries written in stack frames, and wherein the stack frames are stored in the external memory and, at least when originally written, contain program data corresponding to the stack frame control information entries.

14. A computing system comprising:
means for storing a control stack in a control stack buffer of a processor of the computing system;
means for storing program data and control data in a memory external to the processor;
first responding means for responding to a function call by writing a control information entry into the control stack buffer;
second responding means for responding to a control frame filling the control stack buffer, the control frame comprising a plurality of control information entries, and receiving a further function call by writing the control frame to the means for storing program data and control data and by writing a further control information entry, corresponding to the further function call, to the control stack buffer; and
means for authenticating configured to determine an authentication tag using at least a first control information entry and a second control information entry of the plurality of control information entries;
wherein the first responding means and the second responding means comprise the processor.

15. The system of claim 14, wherein the means for storing program data and control data are further for storing a respective portion of the authentication tag in association with each of the first control information entry and the second control information entry.

16. The system of claim 14, wherein the plurality of control information entries comprises more than two control information entries and wherein the means for authenticating are configured to determine the authentication tag by applying a function to all of the plurality of control information entries.

17. The system of claim 14, wherein the means for authenticating are further configured to:
determine an authentication verifier using at least the first control information entry and the second control information entry stored in the means for storing program data and control data; and
determine that the authentication verifier matches the authentication tag;
wherein the system further comprises means for writing the first control information entry from the storage means to the control stack buffer based upon the authentication verifier matching the authentication tag.

18. The system of claim 14, wherein the means for storing program data and control data are further for writing the control frame by forming a split stack, with the plurality of control information entries disposed in a first area of the means for storing program data and control data that is physically separate from a second area of the means for storing program data and control data that stores program data corresponding to the control information entries.

19. The system of claim 14, wherein the means for storing program data and control data are further for writing the control frame by forming a shadow stack, with at least primary portions of the plurality of control information entries being duplicates of primary portions of stack frame control information entries written in stack frames, and wherein the stack frames are stored in the means for storing program data and control data and, at least when originally written, contain program data corresponding to the stack frame control information entries.

20. A non-transitory processor-readable storage device comprising processor-readable instructions configured to cause a processor to:
respond to a function call by writing a control information entry into a control stack buffer in the processor;
respond to a control frame filling the control stack buffer, the control frame comprising a plurality of control information entries, and receiving a further function call by writing the control frame to an external memory, communicatively couple to the processor and physically separate from the processor, and by writing a further control information entry, corresponding to the further function call, to the control stack buffer; and
determine an authentication tag using at least a first control information entry and a second control information entry of the plurality of control information entries.

21. The storage device of claim 20, wherein the instructions are further configured to cause the processor to store a respective portion of the authentication tag to the external memory in association with each of the first control information entry and the second control information entry.

22. The storage device of claim 20, wherein the plurality of control information entries comprises more than two control information entries and wherein the instructions configured to cause the processor to determine the authentication tag are configured to cause the processor to determine the authentication tag by applying a function to all of the plurality of control information entries.

23. The storage device of claim 20, wherein the instructions are further configured to cause the processor to:
determine an authentication verifier using at least the first control information entry and the second control information entry stored in the external memory;
determine that the authentication verifier matches the authentication tag; and
write the first control information entry from the external memory to the control stack buffer based upon the authentication verifier matching the authentication tag.

24. The storage device of claim 20, wherein the instructions configured to cause the processor to write the control frame to the external memory are configured to cause the processor to write the control frame to the external memory by forming a split stack, with the plurality of control information entries disposed in a first area of the external memory that is physically separate from a second area of the external memory that stores program data corresponding to the control information entries.

25. The storage device of claim 20, wherein the instructions configured to cause the processor to write the control frame to the external memory are configured to cause the processor to write the control frame to the external memory by forming a shadow stack, with at least primary portions of the plurality of control information entries being duplicates of primary portions of stack frame control information entries written in stack frames, and wherein the stack frames are stored in the external memory and, at least when originally written, contain program data corresponding to the stack frame control information entries.

* * * * *